United States Patent [19]
> Cittadini et al.

[11] Patent Number: 6,022,028

[45] Date of Patent: Feb. 8, 2000

[54] GASKETS ESPECIALLY FOR REFRIGERATORS BASED ON AN OLEFIN POLYMER

[75] Inventors: Paolo Cittadini, Luvinate; Giancarlo Buzzoni, Barasso, both of Italy

[73] Assignee: Industrie Ilpea S.p.A., Malgesso, Italy

[21] Appl. No.: 08/849,454

[22] PCT Filed: Dec. 16, 1995

[86] PCT No.: PCT/EP95/05061

§ 371 Date: Jun. 18, 1997

§ 102(e) Date: Jun. 18, 1997

[87] PCT Pub. No.: WO96/19534

PCT Pub. Date: Jun. 27, 1996

[30] Foreign Application Priority Data

Dec. 20, 1994 [IT] Italy .................................. MI94A2570

[51] Int. Cl.[7] ..................................................... F16J 15/10
[52] U.S. Cl. ........................ 277/650; 277/944; 277/921; 525/88
[58] Field of Search ..................................... 277/944, 906, 277/921, 650, 629; 156/304.2, 304.6; 49/479.1, 475.1, 476.1, 477.1, 489.1, 490.1, 498.1, 478.1; 525/88, 89, 98

[56] References Cited

U.S. PATENT DOCUMENTS

| | | |
|---|---|---|
| 4,076,669 | 2/1978 | Harper . |
| 4,320,084 | 3/1982 | Elgner . |
| 4,329,309 | 5/1982 | Kelly . |
| 4,672,091 | 6/1987 | Berta . |
| 4,675,139 | 6/1987 | Kehe et al. .............................. 264/491 |
| 5,021,504 | 6/1991 | Fujita et al. .............................. 525/57 |
| 5,257,791 | 11/1993 | Cittadini et al. ....................... 49/478.1 |
| 5,308,894 | 5/1994 | Laughner ................................ 523/436 |
| 5,575,485 | 11/1996 | Merla et al. ............................ 277/629 |
| 5,760,135 | 6/1998 | Kopman et al. .......................... 525/95 |

*Primary Examiner*—Lynne H. Browne
*Assistant Examiner*—David E. Bochna
*Attorney, Agent, or Firm*—Oblon, Spivak, McClelland, Maier & Neustadt, P.C.

[57] ABSTRACT

Gaskets especially for refrigerators are made from a polymeric material consisting of a mixture comprising a-olefin copolymers. The gaskets obtained therefrom are lighter, thinner and have better mechanical characteristics than those of the known art.

8 Claims, No Drawings

GASKETS ESPECIALLY FOR REFRIGERATORS BASED ON AN OLEFIN POLYMER

Magnetic gaskets for refrigerators and amagnetic gaskets for chest freezers are known, formed from extrusions cut into 45°-ended pieces which are joined to form a frame structure by welding then together at their corners.

As an example of the state of the art the following patents may be cited: U.S. Pat. Nos. 67709, 2,958,912, 3,119,158, 3,132,386, 4,700,509, 4,017,759, GB patent 894,249 and Italian patent 1,223,221.

These are generally gaskets comprising a foot for their fixing to the refrigerator door, an extendable bellows chamber and a seat for a bar of magnetized material, or a balloon-type structure for sealing by compression.

PVC has been shown to be a material satisfying the main requirements for the satisfactory manufacture of such gaskets. One such requirement is weldability, ie the ability to resist the welding process when performed on the small thicknesses typical of this type of gasket.

A further requirement is good compromise between rigidity of the extrusion and its ability to recover elastically so as to ensure the elastic movement required for the gasket to seal.

A final requirement is its ability to be extruded into such small thicknesses.

As stated, PVC has proved to be an ideal material for satisfying these basic requirements in gasket manufacture. However in recent times PVC has been questioned from the ecological viewpoint in relation in particular to its disposal, for example by incineration, and waste recycling.

There is therefore an increasing requirement in this sector for a material which can ultimately be proposed as an alternative to PVC in gasket manufacture.

For gasket manufacture, the PVC formulation must include additives, mainly plasticizers, which do not demonstrate migration, in particular towards the anti-impact polystyrene of the refrigerator door liner, or result in staining of the surface finish of the refrigerator cabinet.

For this reason gasket PVC must be formulated with particular plasticizers having minimum migration (as required by DIN 53405). In addition such plasticizers must not be volatile and must provide a permanent plasticizing effect.

It can therefore be seen that the requirements to be satisfied in seeking a replacement material relate to various parameters and factors which are decisive for the technical success of a gasket.

For example vulcanized rubber, in use before the advent of PVC, would not be suitable because traditional vulcanized rubber cannot be extruded to the small thicknesses required for modern gaskets without considerable difficulty, and there are also problems in welding the corners when the gasket pieces are assembled into a frame shape for mounting on the refrigerator.

The basic object of the present invention is to provide a PVC replacement material satisfying all the necessary requirements for manufacturing a gasket of the aforesaid type.

This object together with considerable additional advantages are attained extremely effectively by a material in accordance with claim 1.

According to a preferred embodiment of the invention said mixture comprises a first α-olefin copolymer chosen from polyolefinic thermoplastic rubbers, and a second α-olefin copolymer chosen from thermoplastic block rubbers of the styrene-ethylene-butylene-styrene (SEBS) type.

Said polyolefinic thermoplastic rubber is preferably an ethylene-propylene copolymer.

According to the invention, the constituent mixture of the polymeric material comprises other suitable components such as fillers, oil and other usual components suitable for forming the mixture.

For example the mixture suitable for the purposes of the invention can be prepared by mixing together said α-olefin copolymers in compound form, ie containing the various additives required for its formulation.

The characteristics and advantages of the invention will be more apparent from the following non-limiting practical examples.

EXAMPLE 1

A mixture according to the invention is prepared in the following manner.

Compounded granules of the commercial product Adflex® 7036 XCT (Himont) comprising an ethylene-propylene copolymer as α-olefin copolymer, and granules of the commercial product Multibase® G70A012165W0173 consisting of a compound comprising a styrene-ethylene-butylene-strene (SEBS) block copolymer as α-olefin copolymer, are mixed together under cold conditions in a slow mixer.

The two copolymers are mixed together in the ratio of 55 parts Adflex® to 45 parts Multibase®.

EXAMPLE 2

The procedure of Example 1 is followed, but this time using a ratio of ethylene-propylene copolymer (Adflex®) to SEBS block polymer (Multibase®) of 40:60.

EXAMPLE 3

The mixture produced in Example 1 by mixing granules together under cold conditions is fed to the hopper of a single-screw extruder with a homogenizing screw.

The extrusion temperature is maintained between 160 and 180° C., an extrusion of cross-section based on the design of the gasket user being obtained.

The gasket extrusion is cut into pieces of the desired length with their ends cut to 45°, the pieces being welded together at the corners by a suitable welding apparatus, to form a frame structure ready for mounting on the refrigerator in accordance with the design of the manufacturer.

EXAMPLE 4

The mixture of Example 2 obtained by intimately mixing the component granules together under cold conditions is regranulated in a two-screw extruder at an extrusion temperature of between 160 and 180° C. The new granulate obtained is fed to a single-screw extruder to form the gasket extrusion.

The mechanical characteristics of the gasket extrusions obtained in Examples 3 and 4 from the mixtures obtained in Examples 1 and 2 respectively are summarized in the following table, in which these characteristics are compared with analogous PVC extrusions of the known art.

TABLE

| PROPERTY | UNIT OF MEASUREMENT | EX. 1 | EX. 2 | PVC GASKET |
|---|---|---|---|---|
| Density | g/cm$^3$ | 1.04 | 1.1 | 1.35/1.45 |
| Hardness ASTM D2240 | Shore A | 73 | 69 | 72/76 |
| Ultimate tensile stress ASTM D638 | MPa | 10 | 8 | 8/12 |
| Ultimate elongation ASTM D638 | % | 720 | 650 | 250/350 |
| Dynamic modulus of elasticity under traction at at T = 23/20/5° C. | 23° C. MPa 20° C. 5° C. | 36 45 60 | 24 30 40 | 10 20 80 |
| Brittle temperature $T_{F(3160)}$ ASTM D1043 | T | <−60 | <−60 | −27 |
| Migration (14 days on polystyrene sheet) DIN 53405 | mg | < 1 | < 1 | < 10 |

As can be seen from the aforegoing data, compared with analogous PVC gaskets of the known art (see third column) the gaskets of the invention (Examples 1 and 2) can be made lighter while maintaining a similar hardness and ultimate tensile stress.

The ultimate elongation of the gaskets according to the invention is considerably better than those of the known art in PVC.

The brittling characteristics are also considerably improved in that, as can be seen from the table, a PVC gasket becomes brittle at −27° C., whereas those of the invention do not become brittle until they reach −60° C.

Migration characteristics (14 day test on a polystyrene sheet in accordance with the DIN standard shown on the table) are considerably better for the material of the invention compared with PVC.

In this respect, for this latter the migration-of plasticizers required for its formulation is less than 10, whereas for the examples of the invention the migration of other additives (for example oil as extender agent) is less than 1.

The dynamic modulus of elasticity under traction merits particular comment.

This parameter was measured for the three gaskets shown-on the table at the three different temperatures of 23, 20 and 5° C. The first two temperatures represent virtually ambient temperature conditions, whereas the temperature of 5° C. represents a temperature substantially equal to the operating conditions within the refrigerator.

It is therefore of interest to note how the dynamic modulus of elasticity changes in passing from ambient temperature to the operating temperature, or in other words how the elasticity of the gasket changes from the outside (ambient temperature) to the inside of the refrigerator.

As can be seen, in the case of the standard PVC gasket considerable stiffening occurs during this temperature change, the modulus passing from 10 MPa to 80 MPa.

In the case of the gaskets of the invention there is a much smaller modulus change, which in the case of Example 1 passes from 36 to 60 MPa and in the case of Example 2 from 24 to 40 MPa.

From these values it can be concluded that the extent of low-temperature stiffening of the gaskets of the invention compared with the known gaskets is much less.

In addition the modulus variation for the stated temperature difference is eight times in the case of PVC whereas in the case of the invention it is considerably smaller, it being not even double.

This results in much better uniformity of elastic behaviour in the case of the gasket formed with the material of the invention.

A considerable advantage deriving from this behaviour is the possibility of reducing the thickness of a gasket formed with the new material compared with the thickness of a known-art gasket using PVC.

This advantage, combined with the smaller density of the material of the invention, leads in effect to a reduction in the weight per metre for the gasket of the invention over known-art PVC gaskets, of about 20–45% or more according to the cross-section concerned.

The advantage is therefore considerable, both for the gasket manufacturer, who can use less material in producing gaskets with excellent mechanical characteristics, and the for gasket user, ie the refrigerator manufacturer, who has available a gasket of much better mechanical characteristics, in particular its ultimate elongation, brittling, additives migration and in particular elasticity.

We claim:

1. Gasket suitable to be welded at corners to form a frame structure and formed by extrusion of a mixture comprising a first α-olefin copolymer selected from the group consisting of polyolefinic thermoplastic rubbers, and a second α-olefin copolymer selected from the group consisting of styrene-ethylene-butylene styrene (SEBS) thermoplastic block rubbers, wherein the ratio of the dynamic modulus of elasticity under traction at 5° C. to the dynamic modulus of elasticity under traction at 23° C. is less than 8:1 for said gasket.

2. Gasket according to claim 1, characterised in that said polyolefinic thermoplastic rubber is ethylene-propylene copolymer.

3. Gasket according to claim 1, wherein said mixture comprises at least one other component selected from the group consisting of a filler and oil.

4. Gasket according to claim 1, wherein each of said α-olefin copolymers is in compound form.

5. A frame structure formed from four pieces welded together at the corners of a gasket in accordance with any one of the preceding claims.

6. A process comprising extruding a mixture comprising a first α-olefin copolymer selected from the group consisting of polyolefinic thermoplastic rubbers, and a second α-olefin copolymer selected from the group consisting of styrene-ethylene-butylene styrene (SEBS) thermoplastic block rubbers to form pieces of a gasket, and then welding these pieces together to form a frame structure, wherein the ratio of the dynamic modulus of elasticity under traction at 5° C. to the dynamic modulus of elasticity under traction at 23° C. is less than 8:1 for said gasket.

7. The process of claim 8, wherein the frame structure is part of a refrigerator or a freezer.

8. A gasket formed by extruding a mixture comprising essentially of a first α-olefin copolymer selected from the group consisting of polyolefinic thermoplastic rubbers, and a second α-olefin copolymer selected from the group consisting of styrene-ethylene-butylene styrene (SEBS) thermoplastic block rubbers, wherein the ratio of the dynamic modulus of elasticity under traction at 5° C. to the dynamic modulus of elasticity under traction at 23° C. is less than 8:1 for said gasket.

* * * * *